Patented May 31, 1932

1,861,317

UNITED STATES PATENT OFFICE

WILLIAM PAUL DWIGHT MOROSS, OF CHATTANOOGA, TENNESSEE, ASSIGNOR TO AMERICAN CEMENT PAINT COMPANY, OF ROSSVILLE, GEORGIA, A CORPORATION OF GEORGIA

CEMENT SIZE

No Drawing. Application filed March 22, 1929. Serial No. 349,277.

This invention relates to a cement sizing and a method of making the same.

Almost all stucco, masonry and plaster surfaces contain free lime or other caustic materials. This free alkali often works slowly outward to the surface. When oil paints are applied to such surfaces, the alkali often causes saponification of the oil and consequent disintegration of the paint film. When water paints or calcimines are applied to such surfaces, the lime often comes through to the surface, causing "lime burns" and spotting.

The ordinary size preparations are designed solely to close up the pores in the surface and decrease suction. Their use may decrease the trouble from free alkali, but since they depend largely on mechanically locking in the alkali, and are in themselves generally somewhat porous, these ordinary size preparations do not give thorough satisfaction on such surfaces.

Moreover, wall surfaces are often mechanically weak or friable. The ordinary sizing preparations do not always sufficiently toughen the wall surface for perfect bonding of the finish coat. Peeling of the paint film therefore often results.

It is an object of the present invention to produce a cement sizing which may be employed as a priming coat and is applicable to a number of surfaces, especially stucco, concrete, masonry, plaster, and similar cementitious wall surfaces.

Another object of the invention is the provision of a sizing which will successfully eliminate the trouble from free alkalies which are found in walls and which through moisture come to the surface and destroy or mutilate the paints.

A further object of the invention is the provision of a cement sizing which will harden the surface and form an integral bond with the surface and produce a firm, hard and neutral outer coating to which oil paints, proxylin lacquers and enamels, industrial flats, calcimines or cement paints would adhere and from which surface such paints will not flake or peel.

This invention will be best understood from a consideration of the following detailed description; nevertheless, it is to be understood that the invention is not confined to the disclosure, being susceptible of such changes and modifications which shall define no material departure from the salient features of the invention, as expressed in the appended claims.

The principal ingredients of this sizing or undercoater are as follows:

Hydraulic cement, such as white Portland cement, gray Portland cement, aluminum Portland cement such as that commercially known as "Lumnite", or other natural or Portland hydraulic cement, singly or in combination, to the amount of from 30% to 80% by weight.

A scientifically determined and proportioned amount of filler material, consisting chiefly of silica, preferably amorphous white silica, pulverized quartz or silex, chalk or pulverized limestone or marble or other silicious or calcareous material or materials, singly or in combination, in proper quantity depending upon the exact type of Portland or natural hydraulic cement used.

A suitable quantity of sulfuric casein, muriatic casein, acetic casein, or lactic casein, singly or in combination, together with a suitable quantity of lime or borax or other suitable solvent agent. These caseins are of the commercial type and are named in accordance with the acid employed to precipitate the caseins from milks.

In place of the caseins, a suitable quantity of powdered soap, with or without a suitable quantity of tri-sodium phosphate or other solvent agent or agents, and with or without a small quantity of alum, the soap to be chemically in excess if alum is used, may be employed.

When desirable a suitable quantity of water-soluble sodium silicate, or a suitable quantity of a combination of the caseins, soap, and silicate may be substituted for any single ingredient. A suitable quantity of any other material or materials, singly or in combination, which will in solution react with free alkali to produce an insoluble compound or compounds, or which will physically absorb or adsorb free alkali may be employed.

A small percentage of calcium carbonate, together with a proportionate quantity of alum, preferably aluminum sulfate, or a small percentage of calcium sulfate or ground gypsum is mixed with the above ingredients. A small percentage of talc, soapstone, china clay or asbestos, singly or in combination, with or without a suitable quantity of pigment matter complete the product.

For the most satisfactory results to be obtained from the finished product, the allowable limits of variation of the degree of fineness to which the insoluble portions of the size are ground are rather small. If these insoluble portions are too coarse, the cement film left on the outer surface will be too rough for best results with some of the finer finish coatings. If these insoluble portions are too fine, an unnecessarily large proportion of the cement and other ingredients will be drawn into the pores of the surface. It has been found experimentally that a degree of fineness whereby approximately 90% will pass through a three hundred (300) mesh sieve lies within these limits and gives thoroughly satisfactory results. The limits of variation of fineness of the soluble portions is not so narrowly fixed. The greater the degree of fineness the more rapidly solution takes place.

Since a cement size can most conveniently be handled, packed and marketed in the form of a dry powder, the manufacturing process consists essentially of reducing the component raw materials to a suitable degree of fineness and thoroughly blending them together in the proper proportions.

All of the materials used can be commercially obtained in powder or granular form. They cannot, however, be economically obtained in a degree of fineness suitable for use in a size. Further reduction is therefore necessary.

Any mill or grinding machine capable of reducing the materials to the requisite degree of fineness might be used, whether of the impact or attrition type. Ball, pebble or tube mills are especially adaptable to the conditions met in manufacturing a cement size. Continuous mills might be used, but because of the large number of raw materials used to make up the size, and because of the differences in the degrees of hardness of these materials, continuous mills would not be economical or satisfactory except in very large installations handling large outputs. Batch mills, however, whether ball, pebble or tube, are both economical and thoroughly satisfactory. Because of the different degrees of hardness of the different raw materials, the grinding can best be carried out in two or more stages.

In making a cement sizing, for example, commercial Portland cement is loaded into a batch pebble mill and reduced to a fineness of approximately 85% through 300 mesh. This finely ground cement is then mixed with the other ingredients in the proper proportions and the whole loaded into a similar batch pebble mill and reduced to a fineness of approximately 90% through 300 mesh. The mixing, of course, takes place in the mill. The material is then dumped from the mill, packed in suitable containers, and stored ready for shipment.

To prepare this sizing or undercoater for use it is mixed with water in the following manner: The dry size is placed in a mixing vessel, a proper amount of water added and the whole stirred up until thoroughly blended into a stiff paste. Additional water is then slowly added, with stirring, until the mixture is of the proper consistency for use. It is then applied to the wall surface with a brush or spray gun. The exact proportion of water to use for best results varies with different compositions of the sizing and, within certain rather narrow limits, with a sizing of any one composition. The size as mixed ready for use must be thin enough so that the soluble portions can penetrate easily into the surface to lock in alkalinity and so that the cement film left on the outer surface will not be too thick, but thick enough so that a thin uniform coating of cement will be left on the surface to overcoat. There are other factors, such as the tendency of the cement and other insoluble ingredients to settle out, but the factors which determine the limits of the proportions of water to powder are those stated above. With a size of a certain composition it has been found, for example, that best results are obtained when the mixture is made up in the proportions of two quarts of water to two and one-half pounds of the dry sizing, and that appreciable variations from these proportions, while possible, are not desirable.

On surfaces of concrete, stucco, masonry, plaster and kindred surfaces where free alkalies are normally present in the surfaces, this size or undercoater effectively locks up, both chemically and mechanically, such free alkalies within the surface and prevents their working through to the outer surface, thereby insuring a neutral outer surface.

By virtue of the colloidal properties of a part or all of the soluble materials used in this sizing, especially of the cement, and by virtue of the hardening properties of these colloidal materials, this sizing toughens and hardens the surface to which it is applied.

By virtue of the fineness to which the insoluble portions of this size are ground, and by reason of the colloidal materials above referred to, this size effectively fills up the pores and voids within the surface and decreases the porosity, leaving just sufficient porosity for proper blending of the finish coating.

This size leaves a thin hard coating of neutralized cement and silicious or calcareous material on the outer surface, bonded integrally to the surface. Under the microscope this cement film is seen to be made of tiny interlacing crystals locked together by the colloidal portions of the cement, and offering an excellent surface to which the finish coat can "tooth" or bond.

*Cement and filler.*—The cement reaction is the usual setting and hardening reaction of hydraulic cement, that is: crystallization and the formation of a colloidal gel which hardens on setting, binding together the crystals; except that where Portland cement is used and where calcium sulfate is used or is present from the reaction of other materials, this reaction is retarded or accelerated, depending on the relative amount of calcium sulfate present. In a cement sizing it has been found desirable to have calcium sulfate present in proper quantity to appreciably retard the setting action of the cement, as otherwise the sizing would have to be applied immediately after mixing. It has been found that by properly proportioning the calcium sulfate used, a size may be produced which may with thoroughly satisfactory results be applied as much as four hours after mixing. The filler material here used is chemically inert toward the cement and serves simply to give the mixture "body".

*Casein.*—Sulfuric casein, muriatic casein, acetic casein and lactic casein are all in themselves but slightly soluble in water. In the presence of a small quantity of borax or lime or other alkali, however, all four are quite soluble and dissolve to gummy and viscous colloidal substances of pronounced adhesive properties. Portland cement normally contains a small percentage of free lime. This lime would serve as a solvent for the casein if but a small amount of casein were used. Borax and some other solvent agents, however, bring about the solution of casein more rapidly than does lime and are therefore desirable for use in this connection. This colloidal casein solution possesses the property of reacting with lime or other free alkali to form a colloidal casein-alkali compound which hardens into a horny insoluble substance. It is this reaction which makes casein valuable as an alkali-locking material. The casein solution also imparts certain other desirable properties to the mixed sizing. It lowers the surface tension of the mixed sizing and thereby imparts desirable mixing and spreading properties. Moreover, its adhesive qualities help to hold the cement and other ingredients to and within the wall surface until the cement has set. Any one of the caseins may be used singly to successfully achieve these results. It has been experimentally found, however, that a mixture of sulfuric and lactic caseins, in the proper proportions, gives a more viscous solution than the same quantity of any one of the caseins singly. Such a mixture is, therefore, desirable.

*Soap.*—A soap (usually the sodium salt of stearic or palmitic acid) reacts with lime to form an insoluble "lime soap", calcium stearate or calcium palmitate. Where Portland cement is used, the free lime contained in the cement of course reacts with the soap. An excess of soap must therefore be present to react with any free lime within the wall to which the size is applied. When alum is used with the soap, these materials react to form sodium sulfate and insoluble aluminum stearate or aluminum palmitate. When alum is used the soap must therefore be in excess of that required for reacting both with the free lime contained in the cement and with the alum. These insoluble aluminate or palmitates serve to close up the pores in the surface but they have a tendency to come to the top of the mixed sizing and their use makes much stirring of the mixed sizing necessary. Neither soap alone nor soap and alum nor their reaction products have the adhesive properties of the casein solution. Either soap alone or soap and alum, therefore, is somewhat inferior to casein for use in connection with a cement sizing.

*Sodium silicate.*—Sodium silicate in solution reacts with lime to form insoluble calcium silicate. The free lime present in Portland cement necessitates a substantial quantity of silicate, and sodium silicate in too great proportions is injurious to the proper hardening of Portland cement so that when sodium silicate is employed a predetermined quantity of a casein is used.

*Alum and calcium carbonate.*—Alum in solution reacts with calcium carbonate to form calcium sulfate and aluminum hydroxide. The calcium sulfate serves to retard or accelerate the setting action of the cement, if it is Portland cement. It has been found desirable to use these materials in such quantity that the calcium sulfate formed will appreciably retard the setting of the cement. This retarding action alone could be obtained through the use of calcium sulfate itself or ground gypsum, which is chemically the same thing. The aluminum hydroxide forms as a gelatinous precipitate or gel, however, which adds to the mixing and spreading properties of the sizing. Moreover, this aluminum hydroxide hardens in the pores of the surface to which the size is applied. It is therefore sometimes desirable to use alum and calcium carbonate instead of ground gypsum.

*Talc, soapstone, china clay, asbestos and pigment matter.*—Talc, soapstone, china clay, asbestos and pigment matter are used for their physical properties only and are chemically inert toward each other and toward the other ingredients of the size. The first five add to the mixing and spreading qualities of the size and tend to prevent it from "bunching" on the surface to which it is applied. The pigment matter is used to tone the color of the size down to a neutral shade suitable for overcoating with thin or semi-transparent finish coatings.

In the preparation of the cement sizing, the ingredients are employed in the following proportions:

Body

| | Per cent |
|---|---|
| Portland cement | 46.8 |
| Whiting | 10.6 |
| Amorphous white silica | 10.0 |
| China clay | 5.9 |
| Alum | 4.7 |
| Talc | 4.7 |
| Pigment matter | .8 |

Neutralizer and adhesive

| | |
|---|---|
| Lactic casein | 5.5 |
| Sulfuric casein | 5.5 |
| Borax | 1.8 |
| Hydrated lime | 3.5 |
| Total | 99.8 |

Where soap is substituted for lactic casein and sulfuric casein approximately 11% of the soap may be employed for the purpose or 5.5% of sulfuric casein in used in connection with 5.5% soap.

The reaction between alum, whiting and casein further aids in the production of a more adhesive substance in the final product particularly after the water has been added. In such a reaction aluminum hydroxide is formed which tends to blend with the casein solution to add to the adhesiveness of the sizing and when the product is dry, after the application to a wall, the action of the hydroxide on the casein provides for a hard surface coating.

I claim:

1. A size comprising a mixture of amorphous white silica, china clay, talc, pigment, a re-action product of Portland cement, calcium carbonate, alum, lactic casein, sulfuric casein, borax, and hydrated lime.

2. A size comprising a mixture of mineral fillers, Portland cement, water, the reaction products of calcium carbonate, sulfuric casein and lactic casein, and alum including a retarding agent for the Portland cement and a gelatinous precipitate such as aluminum hydroxide which aids in the mixing of the size and which forms an insoluble filler for the pores of the size when set.

3. A size comprising a mixture of 10% amorphous silica, 6% china clay, 5% talc, eight-tenths percent of pigment matter, and a reaction product of 48% Portland cement, 10% calcium carbonate, 4.7% alum, 5.5% lactic casein, 5.5% sulfuric casein, 1.8% borax, and 3.5% hydrated lime.

WILLIAM PAUL DWIGHT MOROSS.